April 22, 1969

F. D. McCRAY 3,439,542

PNEUMATIC AMPLIFIER SAMPLING VALVE
FOR CHROMATOGRAPHIC ANALYZERS

Filed June 20, 1966

INVENTOR.
F. D. McCRAY

BY *Young & Quigg*

ATTORNEYS

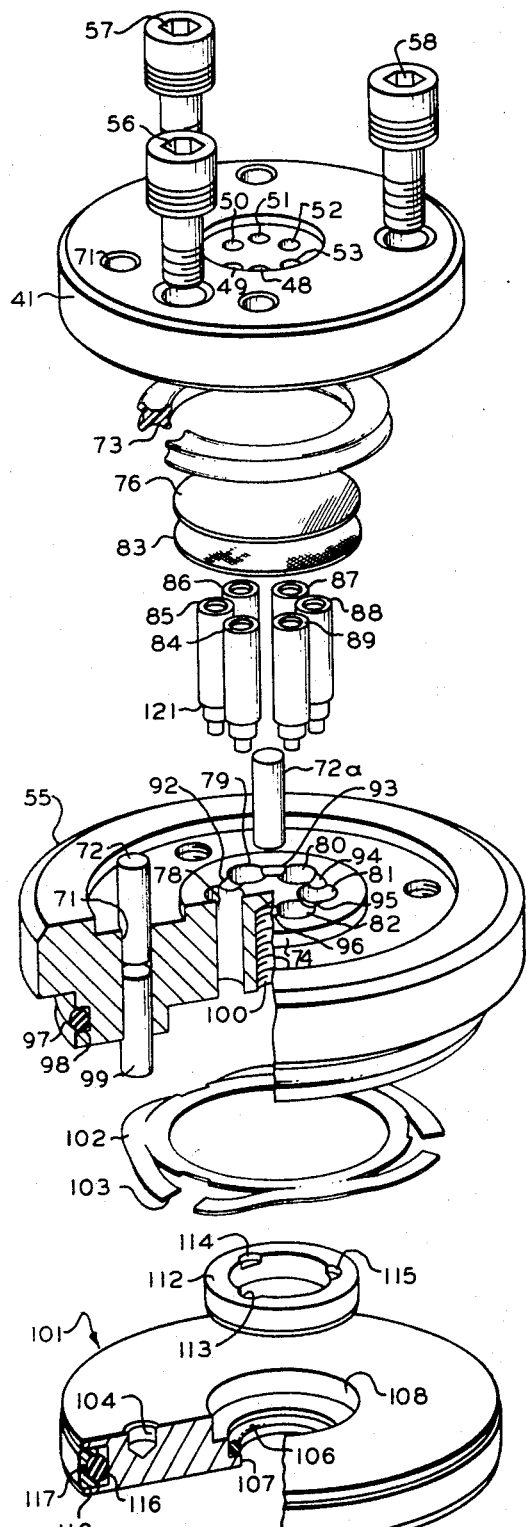
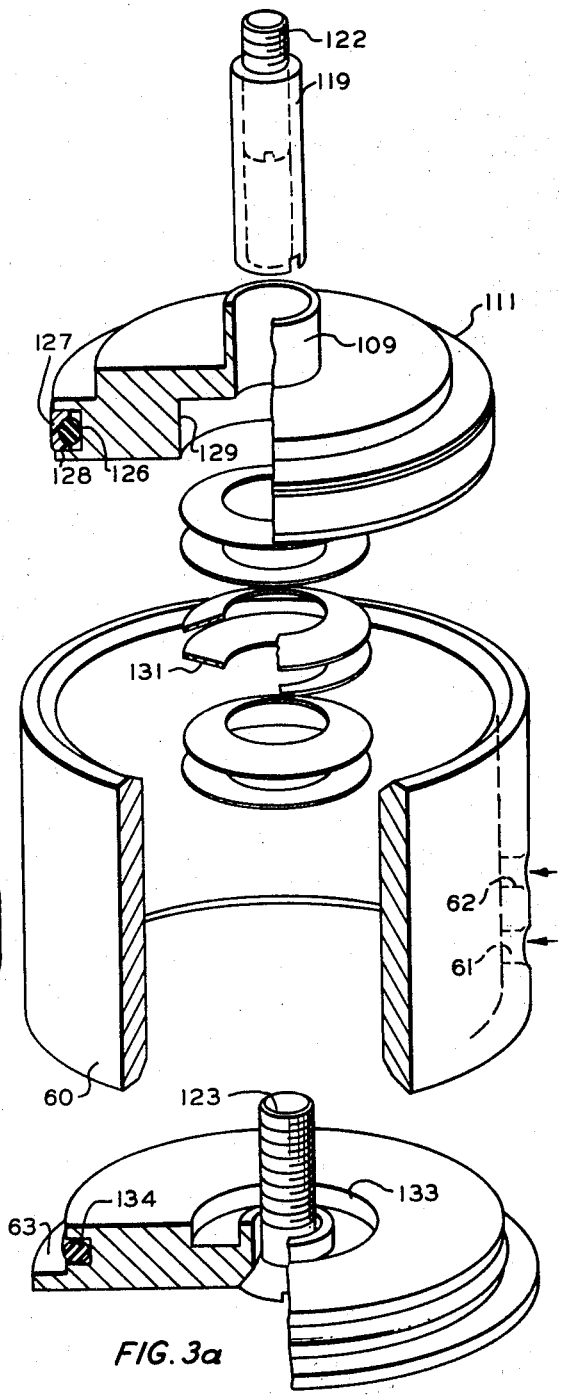
FIG. 3
FIG. 3a
INVENTOR.
F. D. McCRAY
BY Young & Quigg
ATTORNEYS INVENTOR.
F. D. McCRAY
BY Young & Quigg
ATTORNEYS

United States Patent Office

3,439,542
Patented Apr. 22, 1969

3,439,542
PNEUMATIC AMPLIFIER SAMPLING VALVE FOR CHROMATOGRAPHIC ANALYZERS
Floyd D. McCray, Bartlesville, Okla., asisgnor to Phillips Petroleum Company, a corporation of Delaware
Filed June 20, 1966, Ser. No. 558,781
Int. Cl. G01n 1/24
U.S. Cl. 73—422         2 Claims

ABSTRACT OF THE DISCLOSURE

A pneumatically operated sampling valve of the type having a diaphragm for selectively closing and opening a series of passageways. The diaphragm is actuated by a series of plungers on the other side thereof in turn operated by a plurality of pistons. The construction is such that one side of the diaphragm is exposed to the pressure in the piston operating chamber. Means are provided to regulate the pressure in the piston actuating chambers so that the pressure of the sample handled can be below atmospheric in one embodiment and extremely high in another embodiment.

---

Figure 1:
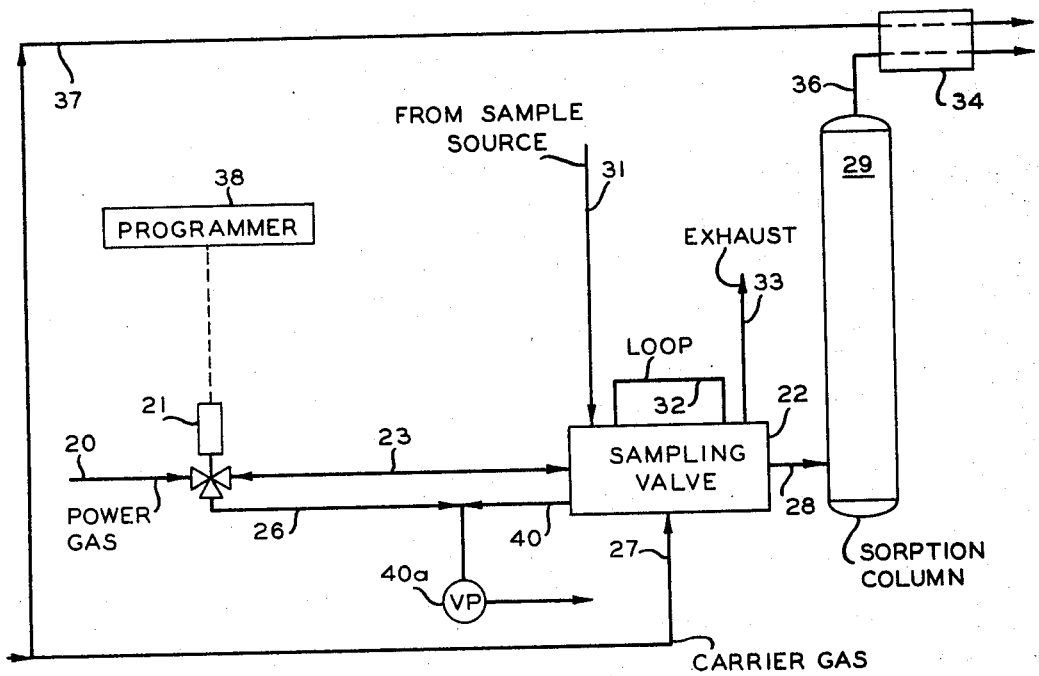

This invention relates to pneumatic amplifier sampling valves for chromatographic analyzers. In one of its aspects it relates to a multi-port, diaphragm-sealed valve mechanism. In another of its aspects it relates to a fluid-actuated, multi piston-operated, sampling valve for a chromatographic analyzer, the valve having a pressure regulation means connected to a power gas source and to a venting conduit to maintain the pressure across the pistons within a predetermined pressure level regardless of the pressure of the sample gas.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity and simplicity of operation make this type of analyzer very attractive for use in automatic process control. A valve such as that described and claimed in U.S. 3,140,615, has been built for such uses. However, these valves have limits of pressure ranges in which they will operate. For example, they are not recommended for sample streams below 4 p.s.i.g. or above 100 p.s.i.g. In some cases, it is desirable to use a valve to sample high and low pressure gas streams. At low pressure, the pressure of the sample is not sufficient to overcome the inherent stiffness of a sealing disc and thus flow characteristics of the sample gas through the valves are inadequate.

It has been found that by applying a vacuum to the underside of the sealing disc that inherent stiffness of the sealing disc can be overcome and the valve can be operated at low sample pressures. However, in applying the vacuum to the sealing disc, the differential pressure across spring loaded pistons is increased. This increase in pressure across the pistons causes in some cases unpredictable operation of the valves since the spring pressure is insufficient in some cases to overcome the added force of the vacuum on the pistons.

In order to overcome this problem, it was proposed to increase the spring pressure within the piston to the extent necessary to overcome the added force due to the vacuum. This modification involves dismantling of the valve, inserting other springs or additional springs into the valve chambers and then reassembly of the valve.

I have now discovered that by connecting the valve actuating the pressure supply line to the same vacuum system which evacuates the spring loaded piston chamber and draws a vacuum on the sealing disc during that period of time in which the valve is spring operated, the valve can be suitably operated with no pressure differential across the pistons. In this embodiment of the invention, the piston chamber is connected to the vacuum pump and the springs can operate normally since the pressure on each side of the pistons is the same. This simple modification avoids the problem of dismantling, adding additional springs, and assembling when it is desirable to use the sampling valve at low pressures.

With this arrangement, the valve can also be used for sampling high pressure sample streams. Normally, without the modification, the sample stream, if at high enough pressure, will create a force on the pistons which will overcome the force of the springs on the pistons. Thus, by the use of the invention, a pressure supply source can be attached to the piston chamber and to the spring chamber, thereby overcoming the force due to the sample stream. The additional pressure which is supplied to the bottom of the spring-operated piston seals the valve and prevents leakage. If the air-operated piston chamber is vented when the spring chamber is under high pressure, then the pressure differential across the pistons will be very large. The valve operates most effectively when there is a maximum predetermined pressure drop, for example 30 to 35 p.s.i., across the pistons. Thus, when the pressure supply to the piston-operated chamber is connected to an auxiliary pressure supply source, there can be maintained at all times a predetermined pressure drop, for example 30 to 35 p.s.i., across the pistons regardless of the pressure of the sample gas. Thus, this small modification allows the operation of the valve for high pressure sampling without dismantling and reassembling of the valve.

By various aspects of this invention, one or more of the following, or other, objects can be obtained.

It is an object of this invention to modify a fluid-actuated multi piston-operated, sampling valve to allow operation in the range of 3 p.s.i.g. up to 5000 p.s.i.g.

It is a further object of this invention to provide a sampling valve assembly which will operate at extremely low and high pressures with equal facility.

It is a still further object of this invention to provide a chromatographic analyzer sampling valve which can operate at high and low pressures without internal modification.

It is a still further object of this invention to provide a fluid-actuated, multi piston-operated, sampling valve assembly which can maintain a predetermined pressure differential across the pistons regardless of sample pressure.

Other aspects, objects, and the several advantages of this invention are apparent to one skilled in the art from a study of this disclosure, the drawings, and the appended claims.

According to the invention, pressure in a fluid-actuated, piston-operated, sampling valve assembly is equalized in chambers on the valve which are separated by pistons during the time interval in which the pistons are spring actuated. In one embodiment, a vacuum source is used to operate the valve at low pressures. In another embodiment, a high pressure source is used to operate at high pressures.

Figure 2:
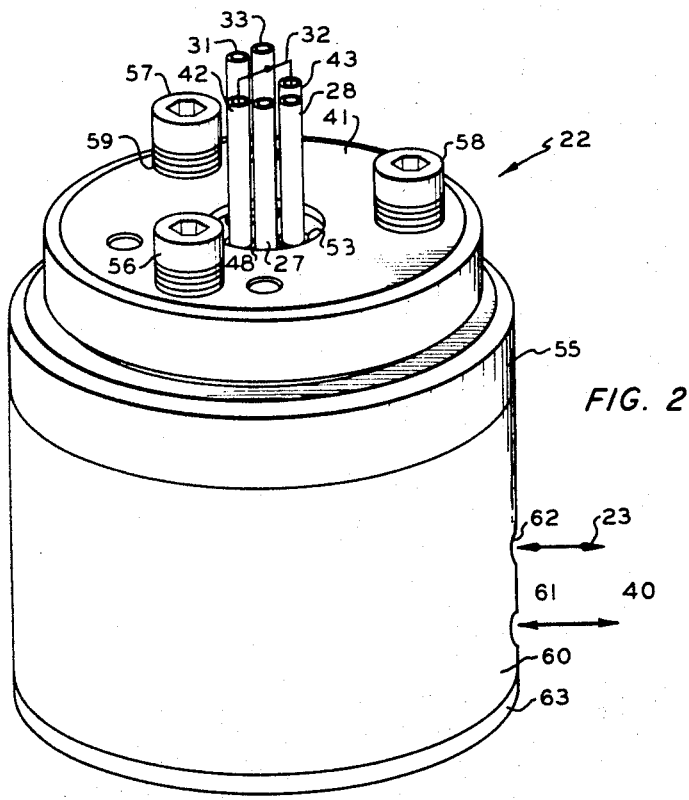
Figure 4:
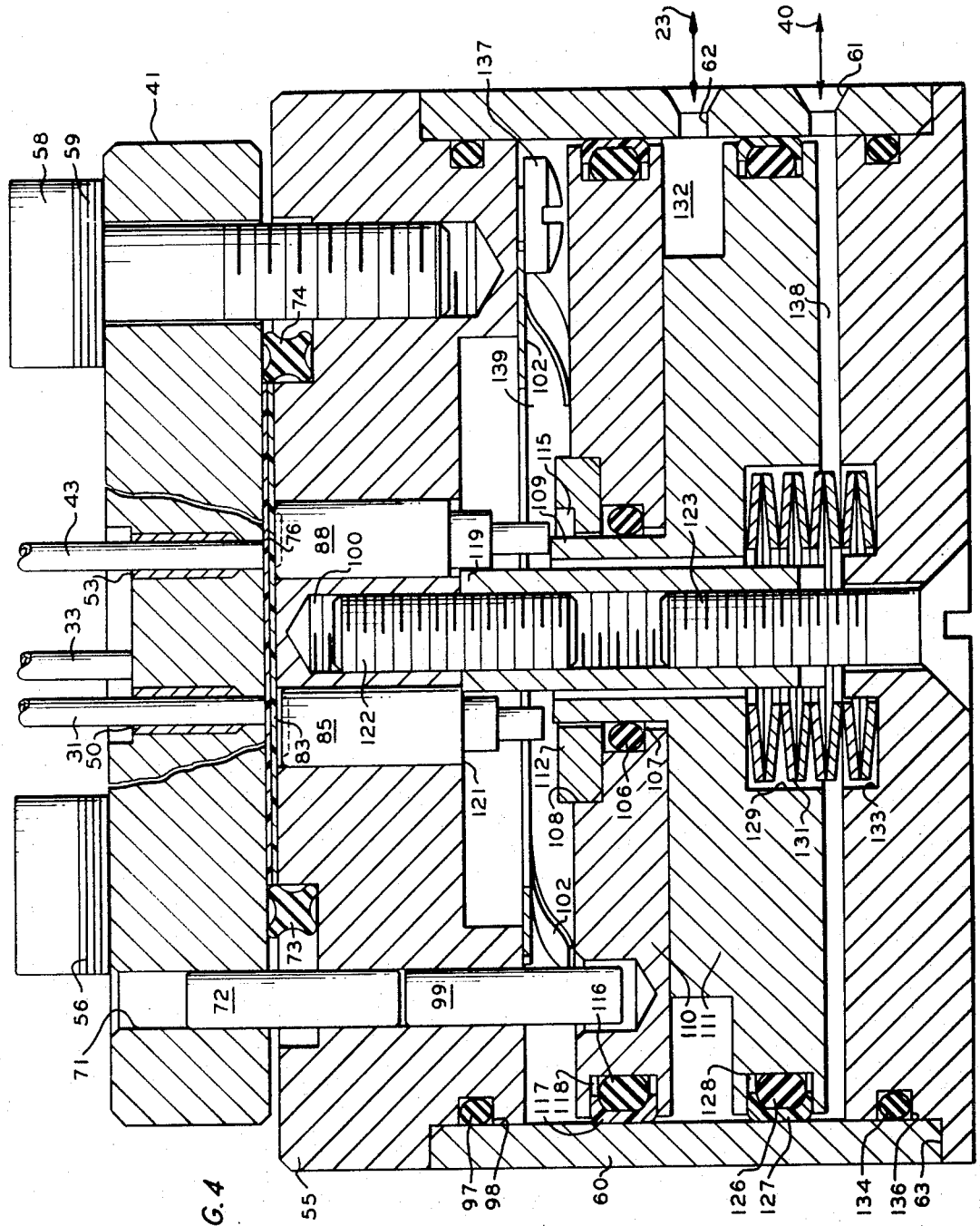

The invention will now be described with reference to the accompanying drawings in which FIGURE 1 is a schematic flow diagram of chromatographic analyzer system; FIGURE 2 is a perspective view of an assembled fluid-actuated diaphragm-sealed valve shown schematically in FIGURE 1; FIGURES 3 and 3a are exploded perspective views of the components of the diaphragm valve shown in FIGURE 2 arranged in the order of their assemblies; FIGURE 4 is a full sectional view of an assembled valve shown in FIGURES 2 and 3.

Reference is now made to the drawings in detail, wherein like parts have been designated by like reference numerals, and to FIGURE 1 in particular, wherein a power gas, such as air, passes via conduit 20 to pilot valve 21, wherein the power gas stream is directed to a first chamber (not shown) of a pneumatically-actuated, diaphragm-sealed sampling valve 22 via conduit 23. Pilot valve 21 is shown schematically in FIGURE 1. It can be any suitable three or four way valve such as Skinner solenoid valve—V 5 series. Alternately, the sampling valve 22 is vented via conduit 23, pilot valve 21, and pilot exhaust conduit 26. A carrier gas, such as helium or hydrogen, is passed via conduit 27, sampling valve 22, and conduit 28 to column 29. A sample source (not shown) such as from process stream, is connected to sampling valve 22 via conduit 31, being circulated through sample loop 32 of sampling valve 22, and vented therefrom via sample exhaust conduit 33. Periodically, the sample in loop 32 is passed along with the carrier gas, via conduit 28, to sorption column 29, where constituents of the sample are absorbed or adsorbed, depending upon the nature of the contact material, and then are selectively desorbed by a continuing flow of carrier gas therethrough to be identified and measured.

The effluent from the sorption column 29 passes through an analyzer, indicated as thermal conductivity assembly 34, via conduit 36. The output signal from the detector 34 is passed to a recording instrument (not shown), which can be a conventional strip chart recorder. A stream of carrier gas is passed via conduit 37 from conduit 27 directly to the reference cell of detector 34, so as to balance out the effect of the carrier gas in the column 29 effluent. The sample gas to be analyzed generally enters the system continuously through conduit 31. It is exhausted through conduit 33, even when a slug thereof is selected for analysis. Pilot valve 21 is actuated by programmer 38, which can be operated by a time cycle or other means. For a detailed discussion of the design and manner of operation of a typical pilot valve which can be used in conjunction with this invention, see the Model 3C1 air switch of the Compressed Air Service Company, Dayton, Ohio, described in detail in Bulletin 20.

When pilot valve 21 is changed from the first described position, power gas is now exhausted from sampling valve 22 via conduit 23. Carrier gas now passes to sample loop 32, collecting the sample trapped therein, and carrying the same to sorption column 29, via conduit 28. Thus, each time pilot valve 21 is switched to the exhaust position of operation, a measured sample is passed via conduit 28 to column 29 for sorption and desorption therein.

Where carrier gas and/or sample fluid are at subambient pressure, a conduit 40 is connected to another spring chamber (not shown) within the valve. Disposed in conduit 40 is a vacuum pump 40a, which is well known in the art, and which is set to "pull" a continuous vacuum on the underside of the sealing diaphragm (not shown).

According to the invention, the exhaust from line 26 is connected to line 40 which, by means of vacuum pump 40a, draws the same vacuum through lines 26 and 23 as in line 40. Thus, during a first interval of time, line 23 has a pressure supplied to it and lines 40 and 26 have a vacuum drawn on them; and during a second interval of time lines 23, 26 and 40 all have vacuums drawn on them.

In another embodiment, 40a is a constant pressure source which supplies a constant pressure to line 40. In this embodiment the sampling valve is used for sampling a high pressure gas stream. During the first part of the cycle, when power gas is supplied through line 20, valve 21 and line 23, the pressure in line 40 will be less than that in line 23. In other words, power source 20 is maintained at a pressure, a fixed value, for example 30 to 35 p.s.i., above pressure in line 40. During the second part of the cycle during the time in which sample is injected into the sorption column 29, pressure in line 23 is exhausted and equalized with that in line 40 through line 26. By using high pressure in line 40, the vented valve 22 can be operated to sample high pressure gas streams.

In FIGURE 2, there is shown a perspective view of the assembled fluid-actuated flexible diaphragm sampling valve of this invention, generally designated 22. Sampling valve 22 comprises an upper cap 41 provided with six small diameter conduits 27, 28, 31, 33, 42 and 43, which communicate directly with the lower surface of upper block 41 by spaced vertical passages, such as 48. Sample loop 32 communicates between conduits 42 and 43. Conduit 42, for example, is press fitted into spaced passsag 48, thereby effecting a seal. Silver brazing gives mechanical strength to the press fit to prevent twisting the conduit and breaking the seal. Adjacent to upper block is intermediate block 55 provided with a plurality of cylindrical passages (not seen) communicating between the upper and lower faces thereof. Allen headed cap screws 56 to 58 secure cap 41 to intermediate block 55, which is spaced therefrom by a flexible sealing diaphragm and cushion (not seen). Plural Belleville washers, such as 59, are positioned on the shaft of the cap screws. Washers 59 permit tightening down cap 41 evenly. This is due to the feel of slowly increasing torque as turning of cap screws 56 to 58 exerts downward pressure on cap 41, gradually compressing the washers flat. There is an abrupt change in the torque as the washers flatten, indicating that further capscrew tightening would damage diaphragm and/or cap.

Disposed adjacent and supporting body 55 is a cylindrical casing or sleeve 60, provided with threaded passages 61 and 62. An internal spring chamber (not shown) is defined by body 55 and an internally disposed first power piston (not seen). Passage 62 communicates with another internal annular chamber (not shown) disposed within casing 60. Passage 61 communicates with a second internal spring chamber defined by a second power piston, casing 60, and body 63 which also serves as a closure plate and forms the base of valve 22.

Referring now to FIGURES 3 and 3a, showing an exploded view of the sampling valve, cap 41 is provided with one or more vertical passages, such as 71 and 71a which accommodate cap key pins, such as 72, that align cap 41 properly relative to body 55. A resilient quad-ring 73, of generally square cross-section, with concave sides, is disposed between cap 41 and body 55. Ring 73 is preferably composed of an elastomeric material which is chemically inert and heat resistant, such as silicone rubber, and seats on shoulder 74 of body 55 beneath cap 41.

A flexible sealing diaphragm 76, of a diameter about that of the inner diameter of raised portion 74, and at least sufficient to cover vertical passages 77 to 82, is disposed above body 55. Sealing diaphragm 76 is preferably composed of a thermosetting plastic which is chemically inert and heat resistant, such as Teflon (a polymer of tetrafluoroethylene).

Disposed between diaphragm 76 and body 55 is a cushion 83, which is suitably a 2 mil thick cloth of Dacron (a polyester fiber). It serves to prevent the Teflon sealing diaphragm from cold flowing, and also furnishes support for it to prevent ballooning under alternating carrier and power gas pressure, which results in an extended cycling life of the valve. Cushion 83 also serves to distribute pressure on the flexible diaphragm against the lower face of cap 41, thus evening out any variations in thickness of the diaphragm.

A set of metal plunger rods 84 to 89, are located within vertical passages 77 to 82, respectively, when the valve is assembled. These rods are machined to have a central relief in their upper end which provides an annular-shaped contact surface, that allows more sealing pressure per unit area to be exerted against the adjacent areas of cushion 83, as directed. Rods 85, 87 and 89 are 0.010 inch shorter than rods 84, 86 and 88.

Recesses 91 to 96, about 0.010–0.014 foot in depth, are provided within the circle described by passages 77 to 82, each recess communicating with the adjacent vertical passages. This type of communication between the vertical passages minimizes hang-up of sample fluid or carrier gas, and obviates excess pressure drop.

A resilient O-ring 97, of generally circular cross-section, is disposed in a peripheral slot 98 in the lower portion of body 55. This ring makes an air-tight seal between body 55 and supporting casing 60. Extending from the lower end of passage 71 is another key pin 99, that aligns body 55 properly relative to air-loaded first power piston 101. A threaded vertical recess 100 is disposed central of body 55 from the lower face.

A crimped, metal retracting spring 102 machined from a spring steel stock is disposed between the lower surface of body 55 and the upper surface of piston 101. The cut-outs, such as 123, are aligned to permit the passage of key pins, such as 99, therethrough to anchor in recess 104 of piston 101.

A resilient O-ring seal 106, of generally circular cross-section, is disposed on a shoulder 107 within a passage 108 central of piston 101. As assembled, ring 106, makes sealing contact with collar 109 of spring-loaded, second power piston 111. An annular shaped member 112, serves as a retainer for ring 106, and as a push disc for short plunger rods 85, 87 and 89. Disc 112 is provided with three notched out recesses, 113 to 115, which are adjacent to the lower ends of long plunger rods 84, 86 and 88. These recesses serve as reliefs preventing contact between the rods and disc 112. The lower edge of disc 112 is beveled to aid seating body 101. Another O-ring 116 and a cap seal 117 comprising a thermosetting plastic, such as Teflon, are disposed in a slot 118 in the periphery of piston 101, permitting a sealing contact with the inner wall of casing 60.

An internally threaded cylindrical bushing 119 is provided, having a diameter so that it may pass slidably within collar 109. This upper end of this bushing provides a stop for all the plunger rods in their retracted position, by the contacting of shoulder 121 of rod 84, for example. Assembly screw 122 secures the upper portion of bushing 119 to a threaded recess (not shown) in the lower face of body 55. Another assembly screw 123 secures base 63 to the lower portion of bushing 119, permitting all components between body 55 and base 63 to be compressively tightened together.

An O-ring 126 and cap seal 127 are disposed in a slot 128 in the periphery of piston 111, permitting a sealing contact with the inner wall of casing 60.

A recess 129 is provided in the lower face of piston 111, located central thereof, to accommodate Belleville washers, such as 131, which are grouped in opposing pairs to give the desired amount of upward bias to spring-loaded piston 111, this forces and maintains longer piston rods, like 89, closed, while no power gas pressure is in the annular chamber 132 (see FIGURE 4) defined by pistons 101 and 111. Annular recess 133 in the upper face of base 63 provides a boss for washers 131. A resilient O-ring 134 is disposed in a peripheral slot 136 in base 63, permitting an air-tight seal between casing 60 and base 63.

In FIGURE 4, the assembled valve is shown in full section, except for the assembly screws, pins and plunger rods. A screw 137 is seen which retains retracting spring 102 fastened to the lower surface of body 55. Spring 102 is located in a relief chamber 138 defined by body 55 and air-loaded piston 111. The vacuum (or pressure) line 40 communicates via passage 61 with chamber 138. Chamber 138, in turn, is in communication with chamber 39 through an annular area between bushing 119 and second power piston 111 and also with the underside of cushion 83 via the working tolerances surrounding the plunger rods, such as 88.

In operation, in the absence of power gas flowing to chamber 132, the valve is in the unexcited, "fail safe" condition, preventing intermingling of sample fluid and carrier gas streams. In this at-rest position, depicted in FIGURE 4, spring washers 131 are exerting force on spring-loaded power piston 111, and through collar portion 109 thereof, holding adjacent long piston rods 84, 86 and 88 in sealing contact with adjacent portions of cushion 83 and sealing diaphragm 76, causing the latter to seal against the lower face of cap 41. Short plunger rods 85, 87 and 89, not being in contact with collar 109, rest on the upper end of bushing 119, the adjacent portions of cushion and diaphragm being relieved, allowing flow between adjacent vertical passages.

Now, carrier gas flowing continuously in conduit 27 enters valve 22 via spaced passage 48, passing downwardly to lower face of cap 41, and over toward either spaced passage 49 or 53, depending upon whether piston rod 84 or 89 is in sealing contact with the diaphragm. Since in the unexcited position only longer rod 84 is in sealing contact, carrier gas flows from recess 96 across the top of vertical passage 82, under the diaphragm, over a recess 95 and into spaced passage 53, and out of valve 22, via conduit 28 to sorption column 29. Concurrently, sampling fluid continuously flowing from sample source conduit 31, under less than ambient pressure, enters valve 22 through spaced passage 50. Since longer rod 86 is in sealing contact with the diaphragm, sample fluid flows from recess 12 across the top of vertical passage 78 under the diaphragm, over to recess 91 and into passage 49, and out of valve 22, via conduit 42, into sample loop 32. Sample fluid re-enters valve 22 from loop 32 via conduit 43 and passage 52. Since longer rod 88 is in sealing contact with the diaphragm, sample flows from recess 94 across the top of vertical passage 80, under the diaphragm, over to recess 93 and into spaced passage 51, and out of valve 22, via conduit 33 to sample exhaust.

In this "at-rest" position, lines 23 and 40 would be connected to vacuum pump 40a, thus making the pressure on each side of piston 111 and 110 the same. By this arrangement, springs 131 and 102 can operate as they would normally operate without having to overcome any force due to vacuum or the like. The operation is the same with regard to the springs as if there were atmospheric pressure introduced through 61 and 62.

If it is desirable to operate at elevated pressures, for example up to 5000 p.s.i.g., then lines 26, 23 and 40 are connected to a high pressure line which supplies, for example 80 p.s.i.g. As will be obvious, the pressure on either side of the pistons 110 and 111 will be equal, thus allowing springs to operate as normally intended. In the case of a high pressure sample, when sampling was desired, power gas would be supplied at, for example 110 to 115 p.s.i.g.

When pilot valve 21 is switched to its alternate position, as determined by programmer 38, now power gas flows thru conduit 23 to sampling valve 22, entering chamber 132 via passage 62. In the case of a low pressure sample, the pressure of the power gas can be reduced by the amount of pull by vacuum pump 40a. In other words, if vacuum pump 40a reduces pressure in conduit 40 by about 15 p.s.i., then the power source could be reduced to about 15 to 20 p.s.i.g. As the power gas pressure builds up in chamber 132, it exerts force on air-loaded power piston 101, first overcoming weak retracting spring 102 and contacting shorter piston rods 85, 87 and 89, raising them to make sealing contact with adjacent portions of cushion 83 and diaphragm 76, causing the latter to seal against the lower face of cap 41, thus shutting off sample and carrier gas flow through valve 22.

Subsequently further pressure build-up in chamber 132 exerts sufficient force on spring-loaded power piston 111 to overcome stronger Belleville washers 131, allowing longer rods 84, 86 and 88 to retract into their vertical passages about .010 inch, by seating on the upper end of bushing 119. The notched recesses, such as 115, must be at least .020 inch deep .010 inch of which is to allow short rods, such as 85, to rise into sealing position on power gas signal, and the other .010 inch of which is to allow long rod, such as 88, to retract sufficiently open to allow flow across the vertical passage between the recesses adjacent the spaced passages.

This sequence is characterized as a "make seal before break seal" mode of operation, which prevents leakage of fluids from one path of flow to the alternate, as the paths of flow are being alternated.

Carrier gas from conduit 27 still enters valve 22 via passage 48, passing downwardly to the lower face of cap 21. Since in this excited position, shorter rod 89 is in sealing contact with diaphragm, carrier gas flows from recess 96 across the top of vertical passage 77, under the diaphragm, over to recess 91 and into spaced passage 49, and thence to sample loop, driving the sample slug trapped therein before it. The carrier gas, with sample fluid entrained, re-enters valve 22 from loop 32 via conduit 43 and spaced passage 52. Since shorter rod 87 is in sealing contact with the diaphragm, sample flows from recess 94 across the top of vertical passage 81, under the diaphragm, over to recess 95 and into spaced passage 53 and out via conduit 28 to sorption column 29 for separation of the constituents in the sample slug in said column.

Simultaneously, sample fluid still enters valve 22 through passage 50. Since shorter rod 85 is in sealing contact with the diaphragm, sample fluid flows from recess 92 across vertical passage 79 over to recess 93 and into spaced passage 51, and out of valve 22, via conduit 33 to sample exhaust.

When pilot valve 21 switches back to the non-excited position, power gas bleeds down through conduit 23, the power pistons return to their initially described position in reverse sequence and the two sets of piston rods also revert to the position shown in FIGURE 4. Thus, the paths of flow of sample and carrier gas will return to that initially described. The frequency with which the sample slug is passed to column 29 is determined by the operation of the pilot valve 21, controlled through programmer 38.

*Specific example*

By various embodiments of the invention, a standard valve has been modified so that it can operate at extremely low and extremely high pressures. At the low pressure, the vacuum means connected to all internal chambers, provides a zero pressure drop across each piston. Thus, at low sample pressures, the valve can operate as easily as it does at normal sample pressures, i.e. slightly above atmospheric pressure. At high sample pressure, the leakage due to the force of the sample on the sealing plunger, transmitted to the spring-biased pistons and operating thereagainst, by supplying pressure to all chambers within the valve, there is also a zero drop across each piston, while this case supplying sufficient pressure to the sealing plunger to overcome tthe pressure due to the sample gas. Thus, by the invention the pistons can freely operate within the valve chamber at extremely low or extremely high sample pressures without the use of additional spring-biasing means and costly adaptations. By the use of the invention, a standard valve is now operable in the range of 1/10 p.s.i.a. to 1000 p.s.i.g.

Typical pressures on two embodiments are as follows:

*Seiscor Model 8 valve*

Inlet pressure:
 5 mm. Hg ABS
 1000 p.s.i.g.
Outlet pressure:
 0 mm. Hg abs.
 980 p.s.i.g.
Power gas chamber pressure (132):
 20 p.s.i.g.
 80 p.s.i.g.
Relief chamber pressure (138):
 0 p.s.i.a.
 45 p.s.i.g.
Differential pressure:
 35 p.s.i.
 35 p.s.i.

Reasonable variation and modification are possible within the scope of the foregoing disclosure, the drawings, and the claims to the invention without departing from the spirit thereof.

I claim:

1. A fluid-motor actuated valve system for distributing a first fluid comprising, in combination: a first body having two opposite faces; first, second, and third spaced passages in said body, each of said spaced passages communicating between said faces; a second body having an upper face spaced from the lower face of said first body; a first flexible sealing diaphragm positioned between said first and second bodies, said diaphragm being of a diameter at least sufficient to cover said spaced passages; first, second, and third recesses in said upper face, opposite said first, second, and third spaced passages, respectively; first and second passages traversing said second body, within the circle described by said recesses; first and second plunger rods slidably disposed in said first and second passages, respectively; the upper ends of said first and second rods adjacent said diaphragm and intermediate the ports of said first, second, and third spaced passages, so that said first rod seals against said diaphragm intermediate said first and second spaced passages, and so that said second rod seals against said diaphragm intermediate said second and third spaced passages; a first power piston disposed adjacent and below said second body and normally biased out of contact with said second rod; a first chamber defined by the lower face of said second body and the upper face of said first power piston; first biasing means disposed in said first chamber normally biasing said first piston downward; a second power piston disposed adjacent and below said first power piston and normally biased in contact with said first plunger rod; a third body disposed adjacent and below said second piston and normally spaced therefrom; a second chamber defined at its upper end by the lower face of said first power piston and at its lower end by the upper face of said second power piston; a third chamber defined at its upper end by the lower face of said second power piston and at its lower end by said third body; a casing, the inner surface of which makes sealing contact with the peripheries of said power pistons, the upper edge of said casing makes sealing contact with said second body, and the lower edge of said casing makes sealing contact with said third body; a second and stronger biasing means disposed intermediate said second power piston and said third body normally biasing the former upward; means to secure said first, second, and third bodies and said power pistons adjacent to one another in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure greater than said first pressure to said second chamber to exert upward pressure on said first power piston overcoming said first biasing means and exerting force on said second plunger rod, contacting the upper side of said first power piston to force a first portion of said sealing diaphragm adjacent thereto to seal between the ports of said third and second spaced passages of said first body; said second fluid simultaneously exerting increasing downward pressure on said second power piston, overcoming said second biasing means, thus retracting said second piston means, permitting said first plunger rod to break sealing contact with a second portion of said sealing diaphragm adjacent thereto, thereby establishing communication between the ports of said first and second spaced passages; said fourth conduit means adapted to release pressure in said second chamber, during a second time interval, whereupon said power pistons revert to their final described position, during which communication is established between said third and second spaced passages under said diaphragm, while maintaining sealing communication between said first and second spaced passages; a vacuum means; fifth conduit means connected between said third chamber and said vacuum means; and valve means in said fourth conduit means to operably connect said fourth conduit means and said fifth conduit means during said second time interval.

2. A fluid-motor actuated valve system for distributing a first fluid comprising, in combination: a first body having two opposite faces; first, second, and third spaced passages in said body, each of said spaced passages communicating between said faces; a second body having an upper face spaced from the lower face of said first body; a first flexible sealing diaphragm positioned between said first and second bodies, said diaphragm being of a diameter at least sufficient to cover said spaced passages; first, second, and third recesses in said upper face, opposite said first, second, and third spaced passages, respectively; first and second passages traversing said second body, within the circle described by said recesses; first and second plunger rods slidably disposed in said first and second passages, respectively; the upper ends of said first and second rods adjacent said diaphragm and intermediate the ports of said first, second, and third spaced passages, so that said first rod seals against said diaphragm intermediate said first and second spaced passages, and so that said second rod seals against said diaphragm intermediate said second and third spaced passages; a first power piston disposed adjacent and below said second body and normally biased out of contact with said second rod; a first chamber defined by the lower face of said second body and the upper face of said first power piston; first biasing means disposed in said first chamber normally biasing said first piston downward; a second power piston disposed adjacent and below said first power piston and normally biased in contact with said first plunger rod; a third body disposed adjacent and below said second piston and normally spaced therefrom; a second chamber defined at its upper end by the lower face of said first power piston and at its lower end by the upper face of said second power piston; a third chamber defined at its upper end by the lower face of said second power piston and at its lower end by said third body; a casing, the inner surface of which makes sealing contact with the peripheries of said power pistons, the upper edge of said casing makes sealing contact with said second body, and the lower edge of said casing makes sealing contact with said third body; a second and stronger biasing means disposed intermediate said second power piston and said third body normally biasing the former upward; means to secure said first, second and third bodies and said power pistons adjacent to one another in a fixed relationship; a first conduit means connected to supply said first fluid to be distributed under a first pressure to said second spaced passage; a second conduit means connected to receive said first fluid from said first spaced passage; a third conduit means connected to receive said first fluid from said third spaced passage; a fourth conduit means connected to supply, during a first time interval, a second fluid under a second pressure greater than said first pressure to said second chamber to exert upward pressure on said first power piston overcoming said first biasing means and exerting force on said second plunger rod, contacting the upper side of said first power piston, to force a first portion of said sealing diaphragm adjacent thereto to seal between the ports of said third and second spaced passages of said first body; said second fluid simultaneously exerting increasing downward pressure on said second power piston, overcoming said second biasing means, thus retracting said second piston means, permitting said first plunger rod to break sealing contact with a second portion of said sealing diaphragm adjacent thereto, thereby establishing communication between the ports of said first and second spaced passages; said fourth conduit means adapted to release pressure in said second chamber, during a second time interval, whereupon said power pistons revert to their final described position, during which communication is established between said third and second spaced passages under said diaphragm, while maintaining sealing communication between said first and second spaced passages; a pressure supply means; fifth conduit means connected between said third chamber and said pressure supply means; and valve means in said fourth conduit means to operably connect said fourth conduit means and said fifth conduit means during said second time interval; said pressure supply means supplying sufficient pressure to keep said first rod in sealing contact with said diaphragm during said second time interval to block communication between said first and second passages, thereby enabling the system to handle first fluid at pressures which, but for said pressure supply means, would have sufficient force to displace said first rod and establish communication between said first and second passages.

References Cited
UNITED STATES PATENTS
3,140,615   7/1964   Broerman _____ 73—422

S. CLEMENT SWISHER, *Primary Examiner.*